UNITED STATES PATENT OFFICE

PETER UNSWORTH, OF ALGIERS, LOUISIANA.

IMPROVEMENT IN MODES OF CURING MOSS.

Specification forming part of Letters Patent No. 168,944, dated October 17, 1875; application filed July 17, 1875.

*To all whom it may concern:*

Be it known that I, PETER UNSWORTH, of Algiers, in the parish of Orleans and State of Louisiana, have invented a new and Improved Mode of Curing Moss, of which the following is a specification:

The object of this invention is to furnish, and the invention consists in, an improved mode of curing and blackening moss, by means of which the work may be done quicker, more thoroughly, and at less expense than when the old mode is employed.

In carrying my invention into practical effect, I put one hundred gallons of water into a sheet-iron tank of any desired or convenient size, and heat it to 75° Fahrenheit. I then add ten pounds of sumach, six pounds of fustic, and three pounds of caustic soda, and heat the mixture to a temperature of 200° Fahrenheit. I then add eight pounds of japonica, one pound of burnt umber, and ten pounds of copperas, and heat the mixture to the boiling-point. This amount of the mixture is sufficient for one thousand pounds of moss. The moss is then put in while the mixture is boiling, and is boiled for thirty minutes. The moss is then taken out, is passed through boiling water and dried, and is then ready for baling.

Steam-heat may be applied for heating the mixture, or it may be heated by fire, as may be most convenient.

In this way gray moss that has been deadened can be cured in thirty minutes, but moss fresh from the tree will require about eighteen days.

I do not claim treating moss in a boiling solution of caustic soda and iron sulphate; but

Having thus described my invention, I claim as new and desire to secure by Letters Patent—

The process of curing moss by immersing and boiling the same in a solution of caustic soda to which sumach, fustic, japonica, burnt umber, and copperas have been added, as set forth.

PETER UNSWORTH.

Witnesses:
    WM. H. SEYMOUR,
    THOMAS A. K. KILLALY.